US009025741B2

(12) United States Patent
Jackson et al.

(10) Patent No.: US 9,025,741 B2
(45) Date of Patent: *May 5, 2015

(54) CALL PROCESSING IN A VOICEMAIL SYSTEM

(71) Applicant: AT&T Intellectual Property I, L.P., Atlanta, GA (US)

(72) Inventors: James Jackson, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/628,865

(22) Filed: Sep. 27, 2012

(65) Prior Publication Data

US 2013/0028397 A1    Jan. 31, 2013

Related U.S. Application Data

(63) Continuation of application No. 11/940,797, filed on Nov. 15, 2007, now Pat. No. 8,300,779.

(51) Int. Cl.
*H04M 1/64* (2006.01)
*H04M 3/533* (2006.01)

(52) U.S. Cl.
CPC ...... *H04M 3/53333* (2013.01); *H04M 2201/36* (2013.01)

(58) Field of Classification Search
USPC ..................... 379/70, 88.08, 88.22
See application file for complete search history.

(56) References Cited

U.S. PATENT DOCUMENTS

| | | | |
|---|---|---|---|
| 6,016,336 A * | 1/2000 | Hanson | 379/88.23 |
| 6,625,261 B2 * | 9/2003 | Holtzberg | 379/88.23 |
| 6,891,931 B1 * | 5/2005 | Adamczyk et al. | 379/69 |
| 7,224,774 B1 * | 5/2007 | Brown et al. | 379/88.14 |
| 7,231,021 B2 | 6/2007 | Bettis et al. | |
| 7,272,213 B2 * | 9/2007 | Holtzberg | 379/88.25 |
| 7,817,786 B2 | 10/2010 | Lee et al. | |
| 8,654,939 B2 * | 2/2014 | Kovales et al. | 379/88.23 |
| 2004/0203607 A1 | 10/2004 | Satapathy | |
| 2004/0235509 A1 * | 11/2004 | Burritt et al. | 455/519 |
| 2005/0037739 A1 | 2/2005 | Zhong | |
| 2005/0130683 A1 | 6/2005 | Phang et al. | |
| 2005/0213518 A1 | 9/2005 | Ahya et al. | |
| 2006/0203975 A1 | 9/2006 | Erhart et al. | |
| 2007/0153770 A1 | 7/2007 | Goyal et al. | |
| 2008/0187113 A1 * | 8/2008 | Adamczyk et al. | 379/88.23 |

* cited by examiner

*Primary Examiner* — Joseph T Phan
(74) *Attorney, Agent, or Firm* — Wolff & Samson, PC

(57) ABSTRACT

A system that incorporates teachings of the present disclosure may include, for example, a method that involves receiving an indication that communications with a subscriber have been interrupted while engaged in voicemail processing, and recording a pointer to a last state of voicemail processing. Additional embodiments are disclosed.

12 Claims, 4 Drawing Sheets

100

CALL PROCESSING IN A VOICEMAIL SYSTEM

This application is a continuation of U.S. patent application Ser. No. 11/940,797, filed Nov. 15, 2007, which is incorporated herein by reference.

FIELD OF THE DISCLOSURE

The present disclosure relates generally to voicemail systems and more specifically to call processing in a voicemail system.

BACKGROUND

When a subscriber calls a voicemail system and the call is dropped (e.g., a cellular telephone of the subscriber experiences a null in communication coverage), the subscriber typically redials and starts voicemail processing from a fresh start. Similarly, when a subscriber is in the midst of listening to a voicemail message and the subscriber receives another call and places the voicemail system on hold, the voicemail system typically continues presentation of the voicemail message unabated. When the subscriber returns to the voicemail system, the subscriber is generally forced to replay the voicemail message to listen to the portion s/he did not hear when the call was placed on hold.

Some voicemail systems will also terminate the call if they detect the call has switched to a hold state or if the call remains in the hold state too long. When the voicemail system terminates the call, the subscriber is forced to redial and start voicemail processing from a fresh start.

DETAILED DESCRIPTION

In one embodiment of the present disclosure, a computer-readable storage medium can have computer instructions for presenting a voicemail service to a subscriber, detecting that communications with the subscriber have been interrupted, responsive to the detection, recording departure data associated with interactions between the subscriber and the voicemail service, and resuming presentation of the voicemail service according to the departure data responsive to a resumption of communications with the subscriber.

In one embodiment of the present disclosure, a network element can have a controller to inform a voicemail system of an interruption in communications between a subscriber and the voicemail system in order for the voicemail system to record departure data associated with interactions between the subscriber and the voicemail service.

In one embodiment of the present disclosure, a method can involve detecting that communications with a subscriber have been interrupted while engaged in voicemail processing, and recording a pointer to a last state of voicemail processing.

Figure 1:
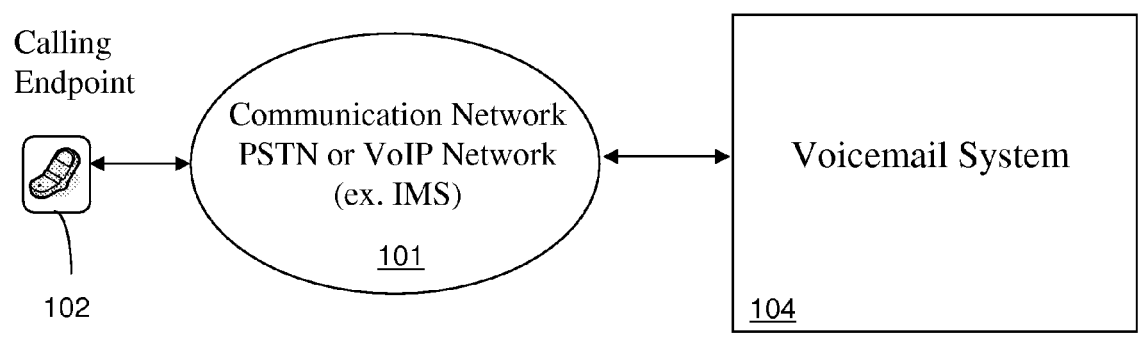
FIGS. 1-2 depict exemplary embodiments of a communication system.

FIG. 1 depicts an exemplary embodiment of a communication system 100. Communication 100 comprises a calling end point 102 such as a cell phone, cordless phone, or wireline phone coupled to a communication network 101 such a Public Switched Telephone Network (PSTN), a Session Initiation Protocol (SIP)-based Voice over Internet Protocol (VoIP) network, or a hybrid network operating according to an IP Multimedia Subsystem (IMS) architecture. By way of the communication network 101, the calling end point 102 can interface with a voicemail system 104 to retrieve and process voicemail messages. The voicemail system 104 can be configured to interface to a circuit-switched (e.g., PSTN) portion of the communication network 101, and/or a packet-switched portion (e.g., SIP or IMS VoIP).

Figure 2:
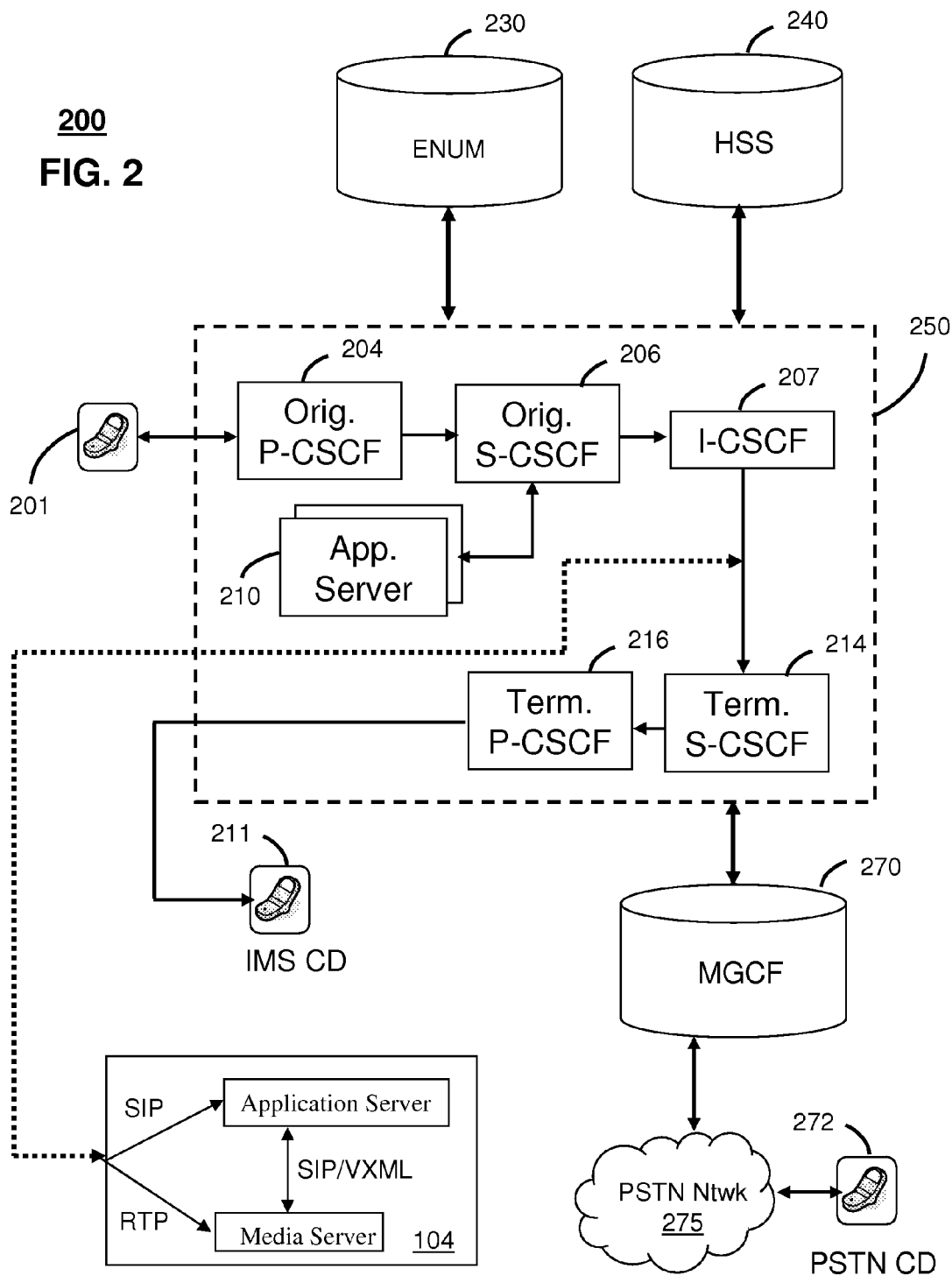

FIG. 2 depicts an exemplary embodiment of a communication system 200 employing an IMS network architecture. Communication system 200 can be overlaid or operably coupled with communication system 100 as another representative embodiment of communication system 100. The communication 200 can comprise a Home Subscriber Server (HSS) 240, a tElephone NUmber Mapping (ENUM) server 230, and common network elements of an IMS network 250. The IMS network 250 can be coupled to IMS communication devices such as an IMS-compliant phones 201, 211, and an IMS-compliant voicemail system 104 such as the one referred to earlier in FIG. 1. PSTN devices such as a PSTN phone 272 can be accessed by the IMS network 250 by way of a Media Gateway Control Function (MGCF) 270 coupled to a PSTN network 275.

The IMS communication devices 201, 211, and the PSTN phone 272 can be a representative embodiment of the calling end point 102 of FIG. 1, while the IMS network 250 can be a representative embodiment of the communication network 101 of FIG. 1.

To establish a communication session between phones, the IMS network 250 can utilize an originating Serving Call Session Control Function (S-CSCF) 206. The originating S-CSCF 206 can submit queries to the ENUM server 230 to translate an E.164 telephone number to a SIP Uniform Resource Identifier (URI) if the targeted communication device is IMS compliant. If the targeted communication device is a PSTN device such as reference 272, the ENUM server 230 will respond with an unsuccessful address resolution and the originating S-CSCF 206 will forward the call to the MGCF 270 which connects the call through the PSTN network 275 using a common signaling means such as SS7.

In the case where the ENUM server 230 returns a SIP URI, the SIP URI is used by an Interrogating CSCF (I-CSCF) 207 to submit a query to the HSS 240 to identify a terminating S-CSCF 214 associated with a targeted IMS communication device such as IMS CD 211. Once identified, the I-CSCF 207 can submit the SIP INVITE message to the terminating S-CSCF 214 which then identifies a terminating P-CSCF 216 associated with the targeted communication device. The P-CSCF 216 can then signal the communication device to establish communications. When the targeted IMS communication device is the voicemail system 104, the ENUM system 230 can be programmed to supply a SIP URI to the originating S-CSCF 206 which then establishes communications between the originating communication device and the voicemail system.

The voicemail system 104 can include an application server 104 supporting SIP message processing, and a Voice eXtensible Markup Language (VXML) for interacting with a calling party by way of synthetic speech, and speech and Dual-Tone Multi-Frequency (DTMF) detection. The voicemail system 104 can further include a media server that processes real-time packet streams conforming to a Real-time Transport Protocol (RTP), and interacts with the application server using SIP and VXML.

In addition to the aforementioned network elements of the IMS network 250, there can also be a number of application servers 210 which can provide a variety of communication services to IMS subscribers. For example, the application server 210 can be used to perform originating treatment functions on the calling party number received by the S-CSCF 206. Originating treatment functions can include determining whether the calling party number has international calling services, and/or is requesting special telephony features (e.g., *72 forward calls, *73 cancel call forwarding, etc.).

Figure 3:
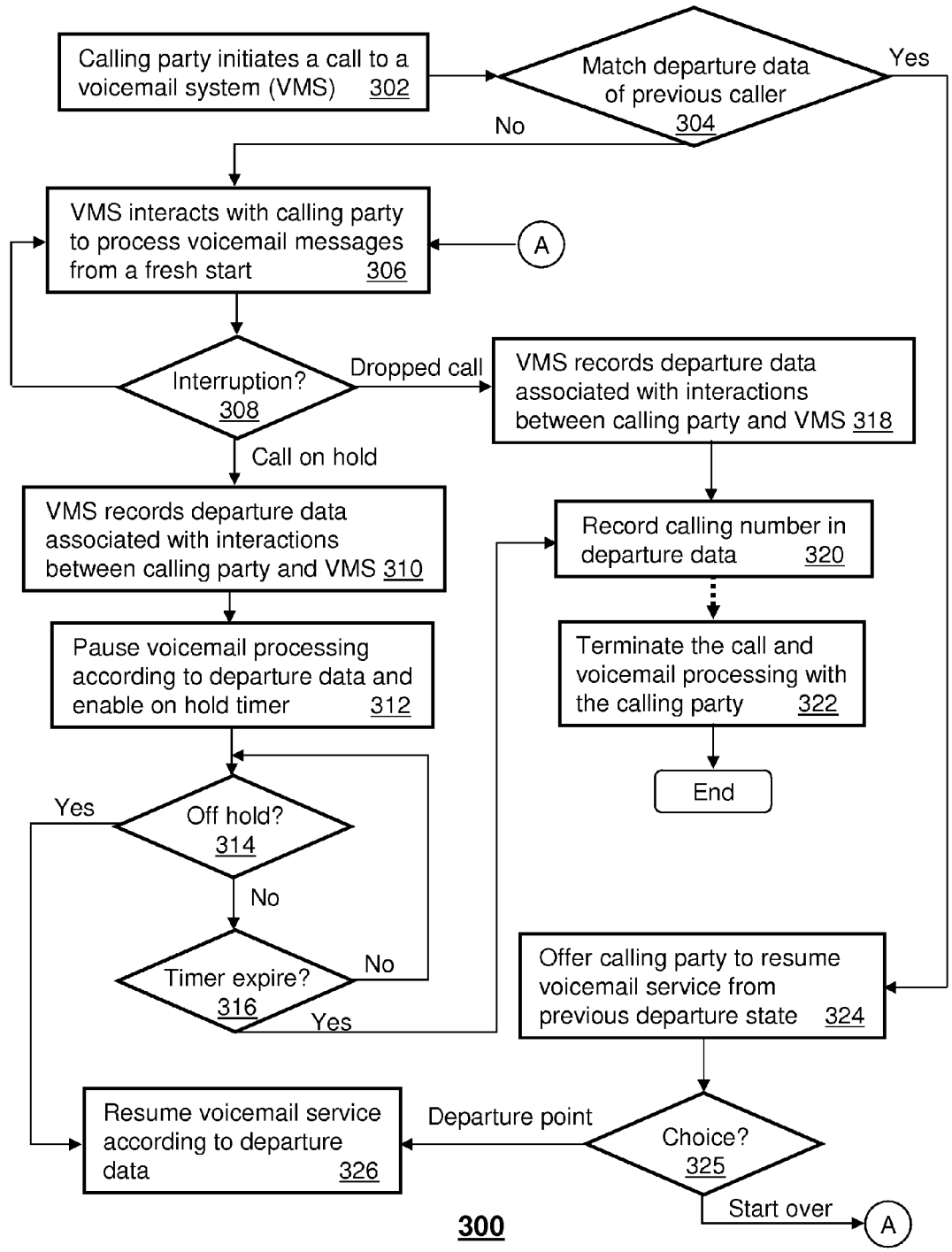
FIG. 3 depicts exemplary method operating in portions of the communication system.

FIG. 3 depicts an exemplary method 300 operating in portions of the communication system 100. Method 300 can begin with step 302 where a calling party initiates a call to a voicemail system (VMS) 104. The calling party in the present instance can be a subscriber of the VMS 104. In step 304, the VMS 104 can determine if the calling party matches departure data from a previous call. Departure data can represent a recording of previous interactive states usage between a subscriber and the VMS 104. Departure data can be used by step 324 in situations where communications with the calling party were interrupted while engaged with the VMS 104.

Postponing discussion of step 324 for the moment, method 300 can proceed from step 304 to step 306 responsive to the VMS 104 detecting that there is no previous departure history with the calling party. In this step, the application server of the VMS 104 treats the call initiated by the calling party as a fresh start for voicemail processing. Accordingly the application server starts from the beginning of a hierarchy of VXML pages to present the calling party a synthetic speech driven voicemail processing menu. The application server can utilize common recognition technology to process speech and/or keypad responses (e.g., DTMF tones) supplied by the calling party as the calling party navigates through the menu. While the VMS 104 is interacting with the calling party, the VMS can monitor in step 308 communication interruptions according to signaling messages supplied by the communication network 101 (e.g., SIP or SS7 messages), and/or by monitoring by common means packetized or circuit-switch voice channels (e.g., RTP, or PSTN channels). A communication interruption can represent a dropped call or an instance in which the calling party chooses to place the call with the VMS 104 on hold while answering another call.

While no interruptions are detected in step 308, the VMS 104 continues voicemail processing with the calling party in step 306. When a communication interruption is detected, the VMS 104 proceeds to one of steps 310 or 318. For example, the VMS 104 can proceed to step 310 when the application server receives a message from the communication network 101 such as a SIP Re-INVITE message that indicates the calling party has chosen to place the call with the VMS on hold. Responsive to this message, the VMS 104 can proceed to step 310 where the application server can inform the media server with a SIP message of the interruption, which in turn causes the media server to record departure data associated with the interactions between the calling party and the VMS at the time of the detected interruption.

The departure data can represent a pointer that can include among other things a state of interaction between the subscriber and the VXML call processing tree operating in the VMS 104 that presents the speech menu referred to earlier, a message identifier identifying a voicemail message recorded by the VMS 104 which was being presented to the subscriber by the media server at the time the interruption arose, and/or a departure time when communications between the subscriber and the VMS ceased. In step 312, the media server of the VMS 104 can use logic in a VXML page to respond to said interruption. For instance, if the calling party was being presented a voicemail message, the VXML page for processing voicemail messages can be programmed with logic to direct the media server to pause presentation of the voicemail message at a departure mark recorded thereby and enable a timer that limits the time resources remain idle. The VMS 104 can also record an identity of the voicemail message, and a state of the speech menu (or state of VXML page processing) at the time the interruption was detected. With departure data such as this, the VMS 104 can pause operations from the state at which the interruption occurred, or alternatively release resources and reinitiate operations from a last known state recorded in the departure data.

In step 314, the VMS 104 can check whether a second message (e.g., another SIP Re-INVITE message) has been received from the communication network 101 indicating that the call is off hold. If such a message is received, the VMS 104 can proceed to step 326 where it resume voicemail processing according to the departure data. For example, in step 326 the VMS 104 can retrieve from the departure data a voicemail message ID, and a departure mark to resume presentation of the voicemail message at or near (e.g., 10 seconds before) the departure mark. If call is on hold for a while (e.g., 45 seconds) the VMS 104 can present the calling party the option to resume voicemail processing from the departure point, or an intermediate point (e.g., instead of presenting a voicemail message from the departure mark, the VMS provides the calling party the option to present the voicemail message from the beginning).

It should be noted that an intermediate point does not mean voicemail processing is reset to the beginning of the voicemail processing hierarchy (like one would experience on a call with no departure history). Rather an intermediate point can be an adjusted point of departure to accommodate situations in which resuming voicemail processing from the departure mark recorded in the departure data may not be desirable. Accordingly, the intermediate point can be a programmable option which can be included in a VXML page to direct the media server as to how to resume presentation of a voicemail message.

For example, suppose the call between the calling party and the VMS 104 was placed on hold for 1 minute 30 seconds, and the interruption occurred while listening to a select voicemail message. In this instance, a VXML page can include logic to adjust the departure mark at or near the beginning of the voicemail message to assist the calling party who may have forgotten what s/he heard earlier. Suppose in another scenario the call is on hold for only 30 seconds. In this instance, the VXML page can include logic to direct the media server to adjust the departure mark only slightly (e.g., 3 seconds) or not at all.

Referring back to step 314, if the VMS 104 does not detect a message indicating the call is off hold, the VMS can proceed to step 316 to determine the state of the timer. If the timer has not expired, the VMS 104 continues to check for an off hold state. If the timer expires, the VMS 104 can proceed to step 320 where it records a caller ID of the subscriber (e.g., a SIP URI, or E.164 number) in the departure data. In step 322, the VMS 104 can terminate the call with the calling party to make resources available for other subscribers. At this point, the VMS 104 ends processing with the calling party and can rely on the recorded departure data in step 310 to address voicemail processing with the calling party on a subsequent call.

Referring back to step 308, if the VMS 104 detects a dropped call from a message received from the communication network 101 (e.g., a SIP message) or by detecting a loss of signal on the bearer channel (e.g., RTP, or PSTN voice channel), the VMS can proceed to step 318 where it records the departure data as previously discussed and the calling party's number in step 320. Since the call has been terminated, the VMS 104 does not need to invoke step 322. Thus, a dropped call and a call on hold exceeding a hold period leads to the same result.

With these principles in mind, the VMS 104 can process new calls from subscribers from a historical perspective. For example, suppose the caller who experienced an interruption in communications with the VMS 104 due to an inadvertent dropped call, or who's call was terminated by the VMS for an excessive hold time redials in step 302. At step 304, the VMS 104 can check for a match between the calling party's caller ID and the departure data (particularly the caller ID recorded in the departure data at step 320). If a match is found, the VMS 104 can proceed to step 324 where it presents the calling party an offer to resume the voicemail service from a previous departure state determined from the departure data.

For example, the VMS 104 might present the calling party the following message: "Good afternoon, it appears that communications were interrupted the last time you accessed your voicemail account. Please say 'yes' or press '1' if you like to process your voicemail messages from where you left off. Or say 'no' or press '2' if you would prefer to start over." If the calling party responds in step 325 with a selection to resume presentation from the departure point, the VMS 104 can proceed to step 326 as previously described. Otherwise if the calling party chooses to start over, the VMS 104 can proceed to step 306 as if the call were associated with a first time voicemail processing request.

Upon reviewing the embodiments disclosed, it would be evident to an artisan with ordinary skill in the art that said embodiments can be modified, reduced, or enhanced without departing from the scope and spirit of the claims described below. For example, method 300 can be adapted to operate in a PSTN communication system using SS7 signaling information to inform the VMS 104 of call interruptions such as dropped calls and calls on hold. In yet another embodiment, method 300 can be adapted to resume presentation of voicemail services without adjusting departure data. In another embodiment, method 300 can be adapted to change VXML logic dynamically according to an observed behavior of a subscriber. For instance, the VMS 104 can perform adjustments to the departure data based on prior interactions with the subscriber. Similarly, the VMS 104 can extend the on-hold timer using similar behavioral data.

Other suitable modifications can be applied to the present disclosure without departing from the scope of the claims below. Accordingly, the reader is directed to the claims for a fuller understanding of the breadth and scope of the present disclosure.

Figure 4:
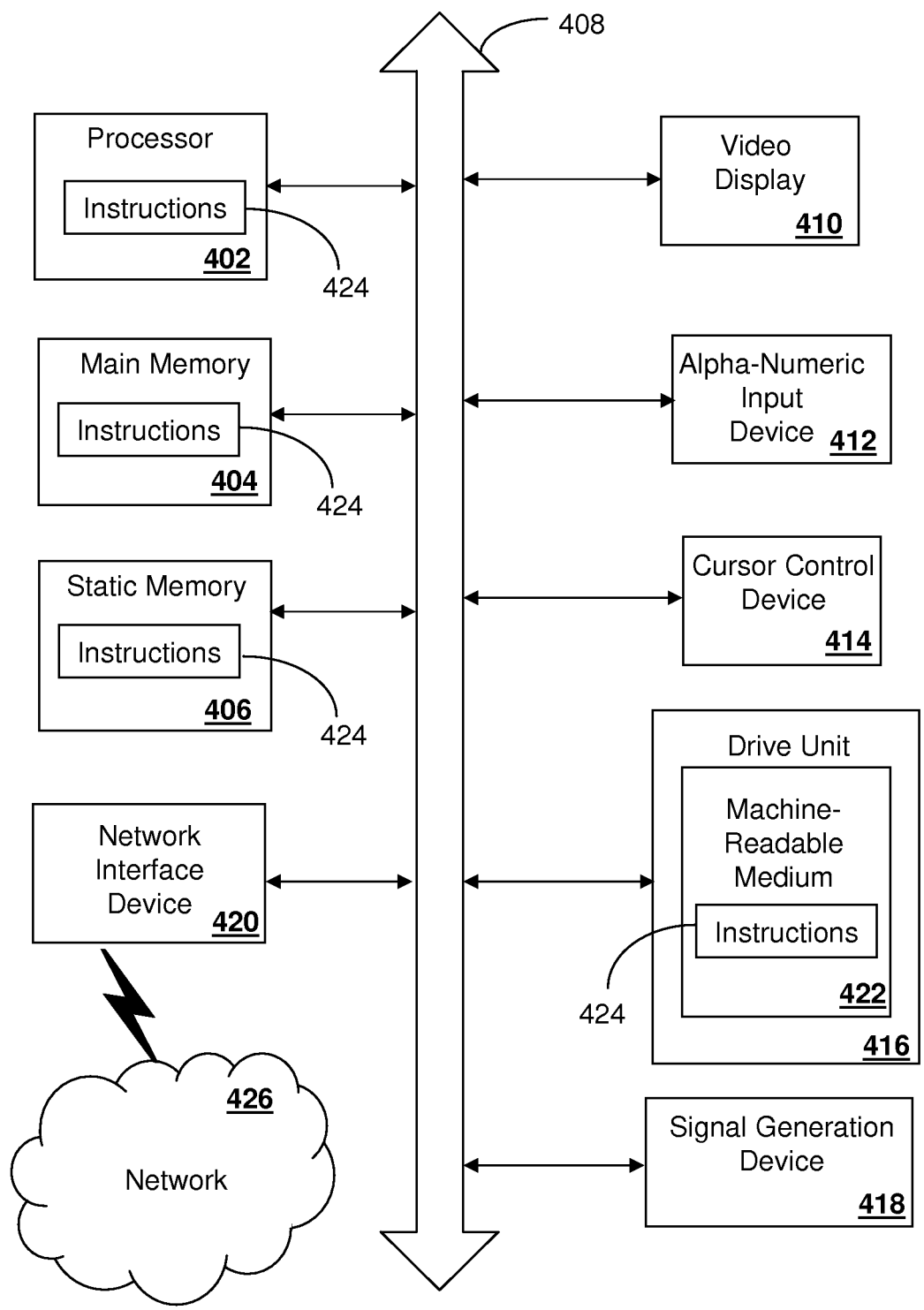
FIG. 4 depicts an exemplary diagrammatic representation of a machine in the form of a computer system within which a set of instructions, when executed, may cause the machine to perform any plurality of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer readable medium storing computer program instructions, which, when executed on a processor, cause the processor to perform operations comprising:
    detecting that a presentation of a voicemail message to a subscriber has been interrupted, resulting in an interruption;
    responsive to the detecting, recording departure data comprising a departure mark that corresponds to the interruption;
    receiving a selection of an option to resume presentation of voicemail processing from the departure mark;
    adjusting the departure mark based on a duration of the interruption to an intermediate location that is after a beginning of a voicemail message and before a point that corresponds to the interruption, wherein an amount by which the departure mark is moved toward the beginning of the voicemail message is in direct relation to a length of the interruption;
    resuming presentation of the voicemail message according to the departure data based on the selection of the option;
    detecting that communications with the subscriber have been changed from an on-hold state to an off hold state;
    responsive to the detecting that communications with the subscriber have changed, resuming presentation of the voicemail message according to the departure data;
    detecting that the communications with the subscriber are on hold by receiving from a communication system a first session initiation protocol Re-INVITE message; and
    detecting that the communications are off hold by receiving from the communication system a second session initiation protocol Re-INVITE message.

2. The non-transitory computer-readable medium of claim 1, the operations further comprising:
    pausing presentation of the voicemail message according to the departure mark.

3. The non-transitory computer-readable medium of claim 2, the operations further comprising:
    enabling a timer;
    detecting an expiration of the timer during the interruption; and
    terminating communications with the subscriber.

4. The non-transitory computer-readable medium of claim 1, the operations further comprising:
    detecting the interruption according to one among:
    receiving a message originating from a network element of a communication system establishing communications between the subscriber and a voicemail service; and
    monitoring interruptions in a bearer channel established by the communication system.

5. The non-transitory computer-readable medium of claim 1, wherein the departure data comprises a pointer to a last session of a voicemail service.

6. The non-transitory computer-readable medium of claim 5, wherein the pointer comprises a calling number of the subscriber, a state of a call processing tree operating in the voicemail service, a message identifier identifying a voicemail message recorded by the voicemail service, and a departure time.

7. A method comprising:
  detecting that a presentation of a voicemail message to a subscriber has been interrupted, resulting in an interruption;
  responsive to the detecting, recording departure data comprising a departure mark that corresponds to the interruption;
  receiving a selection of an option to resume presentation of voicemail processing from the departure mark;
  adjusting the departure mark based on a duration of the interruption to an intermediate location that is after a beginning of a voicemail message and before a point that corresponds to the interruption, wherein an amount by which the departure mark is moved toward the beginning of the voicemail message is in direct relation to a length of the interruption;
  resuming presentation of the voicemail message according to the departure data based on the selection of the option;
  detecting that communications with the subscriber have been changed from an on-hold state to an off hold state;
  responsive to the detecting that communications with the subscriber have changed, resuming presentation of the voicemail message according to the departure data;
  detecting that the communications with the subscriber are on hold by receiving from a communication system a first session initiation protocol Re-INVITE message; and
  detecting that the communications are off hold by receiving from the communication system a second session initiation protocol Re-INVITE message.

8. The method of claim 7, further comprising:
  pausing presentation of the voicemail message according to the departure mark.

9. The method of claim 8, further comprising:
  enabling a timer;
  detecting an expiration of the timer during the interruption; and
  terminating communications with the subscriber.

10. The method of claim 7, further comprising:
  detecting the interruption according to one among:
  receiving a message originating from a network element of a communication system establishing communications between the subscriber and a voicemail service; and
  monitoring interruptions in a bearer channel established by the communication system.

11. The method of claim 7, wherein the departure data comprises a pointer to a last session of a voicemail service.

12. The method of claim 11, wherein the pointer comprises a calling number of the subscriber, a state of a call processing tree operating in the voicemail service, a message identifier identifying a voicemail message recorded by the voicemail service, and a departure time.

* * * * *